US011862921B2

(12) United States Patent
Gao

(10) Patent No.: US 11,862,921 B2
(45) Date of Patent: Jan. 2, 2024

(54) CONNECTOR INSERT DEVICE FOR AUTOMATIC SWITCHING OF CONNECTOR FIXTURES

(71) Applicant: SHENZHEN CITY LINQUAN TECHNOLOGY CO., LTD, Shenzhen (CN)

(72) Inventor: Donglin Gao, Zhoukou (CN)

(73) Assignee: SHENZHEN CITY LINQUAN TECHNOLOGY CO., LTD, Shenzhen (CN)

( * ) Notice: Subject to any disclaimer, the term of this patent is extended or adjusted under 35 U.S.C. 154(b) by 56 days.

(21) Appl. No.: 17/742,409

(22) Filed: May 12, 2022

(65) Prior Publication Data

US 2023/0178951 A1 Jun. 8, 2023

(30) Foreign Application Priority Data

Dec. 3, 2021 (CN) .......................... 202111471160.0

(51) Int. Cl.
*H01R 43/20* (2006.01)

(52) U.S. Cl.
CPC ........ *H01R 43/20* (2013.01); *Y10T 29/53213* (2015.01)

(58) Field of Classification Search
CPC ...... H01R 43/20; H01R 43/28; H01R 43/048; H01R 43/04; H01R 12/58; H01R 43/00; Y10T 29/5193; Y10T 29/53048; Y10T 29/49174; Y10T 29/49826; Y10T 29/5313; Y10T 29/53209; Y10T 29/53365
USPC .................. 29/748, 742, 747, 759, 842, 845
See application file for complete search history.

(56) References Cited

U.S. PATENT DOCUMENTS 6,609,042 B1 * 8/2003 Kumeth .................. B23P 19/04 700/169
2022/0224068 A1 * 7/2022 Sorg ..................... H01R 43/048

FOREIGN PATENT DOCUMENTS

| | | | |
|---|---|---|---|
| CN | 104701707 | A | 6/2015 |
| CN | 205565256 | U | 9/2016 |
| CN | 107380667 | A | 11/2017 |
| CN | 108832463 | A | 11/2018 |
| CN | 109994914 | A | 7/2019 |
| CN | 209282587 | U | 8/2019 |
| CN | 210944332 | U | 7/2020 |
| CN | 111653922 | A | 9/2020 |

* cited by examiner

*Primary Examiner* — Thiem D Phan

(57) ABSTRACT

A connector insert device for automatic switching of connector fixture includes terminal fixing portions clipping a wire, a wire storage portion storing groups of wires, transferring portions configured to store the wire clipped by the terminal fixing portion in the wire storage portion through a conveying portion, a connector fixing portion storing connectors, and an insert portion inserting the groups of wires in the wire storage portion into the connector fixing portion through the conveying portion. Each terminal fixing portion includes a terminal fixing base, a terminal clipping base, and a terminal gripper. The terminal clipping base is rotatably connected with the terminal fixing base through a terminal connecting shaft. The terminal gripper is connected with the terminal clipping base. The terminal fixing portion rotates the wire to a predetermined angle. The transferring portions clip the wire and places the wire in the wire storage portion.

7 Claims, 6 Drawing Sheets

CONNECTOR INSERT DEVICE FOR AUTOMATIC SWITCHING OF CONNECTOR FIXTURES

TECHNICAL FIELD

The present disclosure relates to a technical field of wire harness processing, and in particular to a connector insert device for automatic switching of connector fixtures.

BACKGROUND

A terminal is a type of accessory product configured to facilitate connection of a wire. The terminal is generally made of a metal material and is electrically connected to the wire. Wires are widely used in fields of power supply and communication. In actual production, the wire is unable to be directly connected to an insulating connector. The wire needs to be connected to the terminal before it is combined with various insulating connectors into a usable product. However, only one wire can no longer meet needs of current power supply and communication products. It is often necessary to connect multiple wires connected with the terminal to the insulating connector to produce products that meet the needs. In order to enable the terminal to be connected to the insulating connector safely and stably, a snap-fit structure is arranged on one end (a terminal head) of the terminal away from the wire, so that a structure of the terminal to be connected to the insulating connector must be matched with a structure of the insulating connector. As a result, when producing a wire harness product, it needs to adapt to various insulating connectors and terminal installation forms, which brings new challenges to automated processing of wires.

SUMMARY

In order to solve the problems mentioned in the prior art, the present disclosure provides a connector insert device for automatic switching of connector fixtures, which has the characteristics of wide adaptability, high degree of automation, and high production efficiency.

GLOSSARY

Wire: A wire comprises one or more conductive wires and an outer insulating protective layer that transmits electricity or information from one place to another.

Terminal: An accessory product configured to facilitate connection of the wire. It is made of metal material. A portion of the terminal is directly connected to the wire with an insulating sheath removed, and the other portion of the terminal has a connection structure configured to connect with other components.

Terminal head: A portion of the terminal that has a connecting structure.

Terminal tail: A portion of the terminal that is directly connected to the wire.

In order to solve the problems mentioned in the prior art, the present disclosure provides a connector insert device for automatic switching of connector fixtures.

The connector insert device for automatic switching of connector fixture comprises at least one terminal fixing portion configured to hold a wire to be inserted, a wire storage portion configured to store groups of wires to be inserted, a transferring portion configured to store the wire to be inserted clipped by the terminal fixing portion in the wire storage portion through a conveying portion, a connector fixing portion configured to store connectors of the groups of wires to be inserted, and an insert portion configured to insert the groups of wires to be inserted in the wire storage portion to the connector fixing portion through the conveying portion.

Furthermore, the terminal fixing portion comprises a terminal fixing base, a terminal clipping base, and a terminal gripper. The terminal clipping base is rotatably connected with the terminal fixing base through a terminal connecting shaft. The terminal gripper is fixedly connected with the terminal clipping base. The terminal fixing portion rotates the wire to be inserted to a predetermined angle. The at least one transferring portion clips the wire rotated by the predetermined angle and places the wire rotated by the predetermined angle in the wire storage portion according to a predetermined instruction.

Furthermore, the terminal fixing portion comprises a terminal fixing base, a terminal clipping base, and a terminal gripper. The terminal clipping base is rotatably connected with the terminal fixing base through the terminal connecting shaft. The terminal gripper is fixedly connected with the terminal clipping base. The terminal gripper comprises a first terminal gripper and a second terminal gripper. The first terminal gripper has a first terminal groove. The second terminal gripper has a second terminal groove corresponding to the first terminal groove. The second terminal groove is embeddable in the first terminal groove.

Furthermore, the wire storage portion comprises wire storage components. Each of the wire storage components comprises a wire storage wrench, wire storage buckles, and wire storage grippers. The wire storage buckles are one-to-one corresponding to the wire storage grippers. The wire storage buckles and the wire storage grippers are configured to clip the wires to be clipped. When the wire storage wrench is snapped on one of the wire storage buckles, a corresponding wire is released.

Furthermore, the wire storage portion is a disc structure. The wire storage components are arranged on a circumference of the wire storage portion.

Furthermore, the at least one transferring portion comprises a first transferring clipping component and a second transferring clipping component. The first transferring clipping component is arranged between the second transferring clipping component and the wire storage portion and is close to the second transferring clipping component. The first transferring clipping component is configured to clip a terminal head. The second transferring clipping component is configured to clip a terminal tail.

Furthermore, two transferring portions are provided.

Furthermore, the connector fixing portion comprises connector fixing bases and a connector bracket. The connector fixing bases are movable to a predetermined fixing position along the connector bracket.

Furthermore, the insert portion comprises an insert base. The insert base is movable along the conveying portion.

Furthermore, the insert portion further comprises a first insert component and a second insert component. The second insert component is arranged between the first insert component and the insert base. The second insert component is close to the first insert component. The first insert component clips a terminal head and the second insert component clips a terminal tail.

Furthermore, the conveying portion is a linear motor.

Compared with the prior art, in the present disclosure, the terminal fixing portion clips and rotates the wire to be inserted to the predetermined angle to fix an angle of the wire and the terminal. The at least one transferring portion transfers the wire rotating to the predetermined angle to the wire storage portion. The insert portion takes out the wire to be inserted from the wire storage portion according to the predetermined angle of the wire, and then inserting the wires to be inserted into the connector fixing portion according to the predetermined angle, The at least one transferring portion and the insert portion are movable on the conveying portion to complete transferring and inserting of the wire.

The connector insert device for automatic switching of the connector fixtures of the present disclosure only needs to set a processing sequence of the wire and an inserting angle of the terminal at beginning to automatically complete the work of inserting the wire into the connector. The connector insert device for automatic switching of the connector fixtures of the present disclosure adapts to different sizes of wires and different inserting angles of terminals, which has characteristics of wide adaptability, high degree of automation, and high production efficiency.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor. In the drawing.

Figure 1:
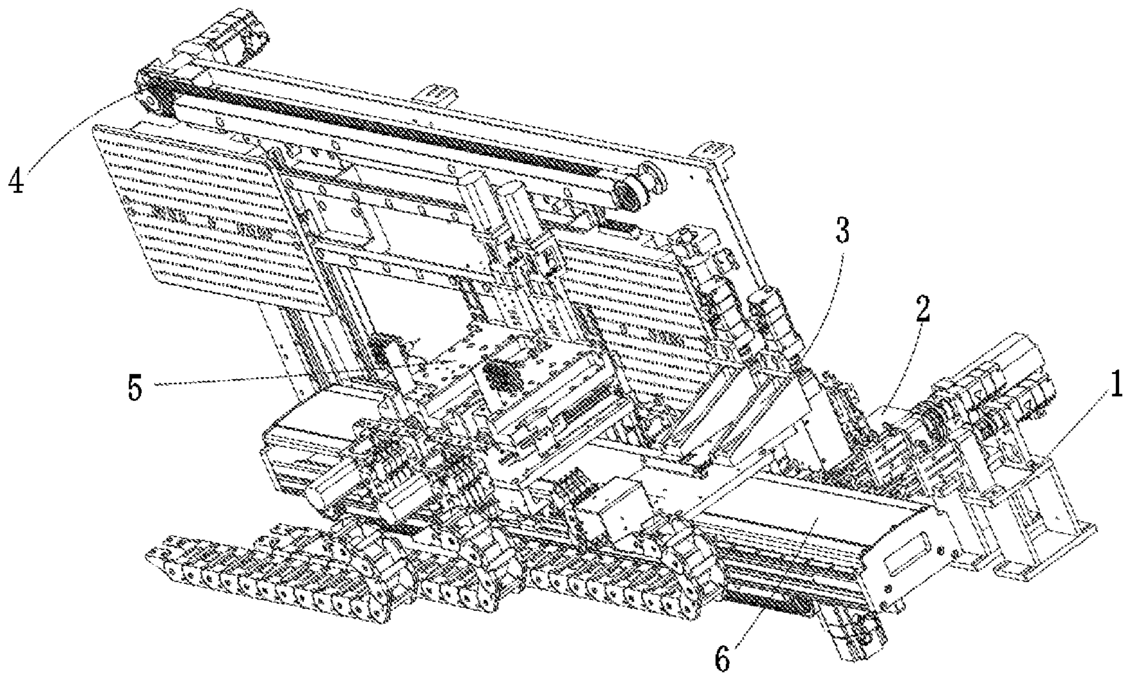
FIG. 1 is a schematic diagram showing an overall structure of a connector insert device for automatic switching of connector fixtures of the present disclosure.

In the drawings: 1—terminal fixing portion; 11—terminal fixing base; 12—terminal connecting shaft; 13—terminal clipping seat; 14—the first terminal gripper; 15—the second terminal gripper; 16—the first terminal groove; 17—the second terminal groove; 2—wire storage portion; 21—wire storage component; 211—wire storage wrench; 212—wire storage buckle; 213—wire storage gripper; 22—wire feeding component; 221—first wire feeding system; 222—second wire feeding system; 223—third wire feeding system; 3—transferring portion; 31—transferring base; 311—first transferring gripper; 312—second transferring gripper; 313—third transferring gripper; 314—first transferring clipping boss; 315—second transferring clipping boss; 32—transferring motor; 33—transferring bracket; 4—connector fixing portion; 41—connector fixing base; 42—connector bracket; 43—connector support column; 5—insert portion; 51—insert base; 52—insert fixture base; 53—first insert gripper; 54—second insert gripper; 55—third insert gripper; 56—first insert boss; 57—second insert boss; 6—conveying portion.

DETAILED DESCRIPTION

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure.

A connector insert device for automatic switching of connector fixtures of the present disclosure comprises at least one terminal fixing portion 1 configured to hold a wire to be inserted, a wire storage portion 2 configured to store groups of wires to be inserted, at least one transferring portion 3 configured to store the wire to be inserted clipped by the at least one terminal fixing portion 1 in the wire storage portion 2 through a conveying portion 6, a connector fixing portion 4 configured to store connectors of the groups of wires to be inserted, and an insert portion 5 configured to insert the groups of wires to be inserted in the wire storage portion 2 to the connector fixing portion 4 through the conveying portion 6.

As shown in FIG. 1, in one embodiment, the at least one transferring portion 3 and the insert portion 5 are arranged above the conveying portion 6 and are movable along the conveying portion 6. The at least one terminal fixing portion 1, the wire storage portion 2, and the connector fixing portion 4 are sequentially fixed on a same side of the conveying portion 6.

Furthermore, the at least one terminal fixing portion 1 rotates the wire to be inserted to a predetermined angle. The at least one transferring portion 3 clips the wire rotated by the predetermined angle and places the wire rotated by the predetermined angle in the wire storage portion 2 according to a predetermined instruction.

In one embodiment, the predetermined angle of the wire to be inserted is set according to actual needs of installation of the terminal and the connector.

In one embodiment, multiple wires need to be inserted into a same connector, an insert angle of each wire is able to be set independently, and an order of the wires to be inserted are set, so that the connector insert device of the present disclosure is able to automatically complete the insertion of the wires. The connector insert device of the present disclosure has a high degree of automation and processing flexibility.

In one embodiment, in order to save an installation space, the conveying portion 6 is a linear motor.

Figure 2:
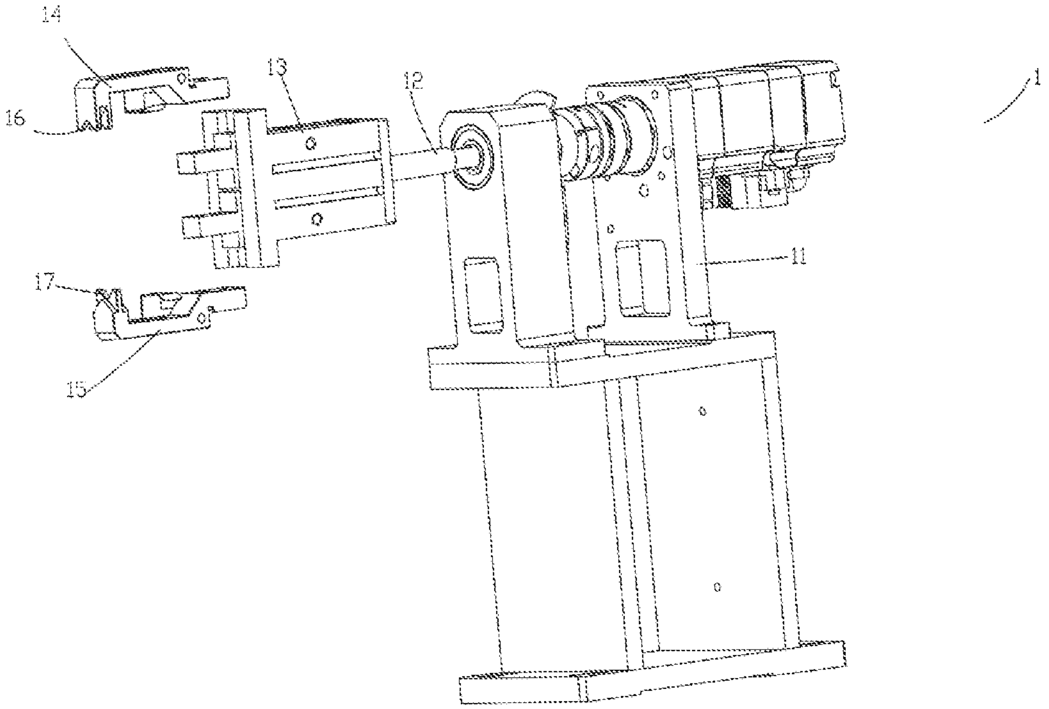
FIG. 2 is a schematic diagram of a terminal fixing portion of the connector insert device for automatic switching of connector fixtures of the present disclosure.

Furthermore, as shown in FIG. 2, the at least one terminal fixing portion 1 comprises a terminal fixing base 11, a terminal clipping base 13, and a terminal gripper.

In one embodiment, the terminal clipping base 13 is rotatably connected with the terminal fixing base 11 through a terminal connecting shaft 12. The terminal gripper is fixedly connected with the terminal clipping base 13. The terminal gripper comprises a first terminal gripper 14 and a second terminal gripper 15. The first terminal gripper 14 has a first terminal groove 16. The second terminal gripper 15 has a second terminal groove 17 corresponding to the first terminal groove 16.

Optionally, both of the first terminal grooves 16 and the second terminal grooves 17 are V-shaped grooves.

Specifically, when the first terminal gripper 14 and the second terminal gripper 15 are installed, the first terminal groove 16 is opposite to the second terminal groove 17.

Optionally, the second terminal groove 17 is embeddable in the first terminal groove 16.

In one embodiment, the at least one terminal fixing portion 1 clips the wire by clipping the terminal. When clipping the terminal, a terminal head faces the terminal clipping base 13.

In one embodiment, after the second terminal groove 17 is embedded into the first terminal groove 16, the terminal is clipped, so that the at least one terminal fixing portion 1 is adapted to different sizes of terminals by adjusting a distance between the first terminal groove 16 and the second terminal groove 17 when clipping the wire or replacing the first terminal groove 16 and the second terminal groove 17. Thus, processing flexibility and production efficiency of the at least one terminal fixing portion 1 is increased.

Further, since the terminal clipping base 13 is rotatable relative to the terminal fixing base 11, the at least one terminal fixing portion 1 is able to adjust an angle of the clipped terminal according to actual needs, which further increases processing flexibility of the at least one terminal fixing portion 1.

In one embodiment, two terminal fixing portions are arranged side by side, which improve processing efficiency. When two terminals are connected to the wire, the two terminal fixing portions 1 clip the two terminals at the same time and different predetermined angles can be set for the two terminals respectively, so that an adaptable range of the terminal fixing portions 1 is further expanded.

In one embodiment, in order to improve an accuracy of a rotating angle of the terminal clipping base 13, each terminal fixing portion 1 comprises a terminal fixing motor.

Optionally, each terminal fixing motor is a servo motor.

Figure 3:
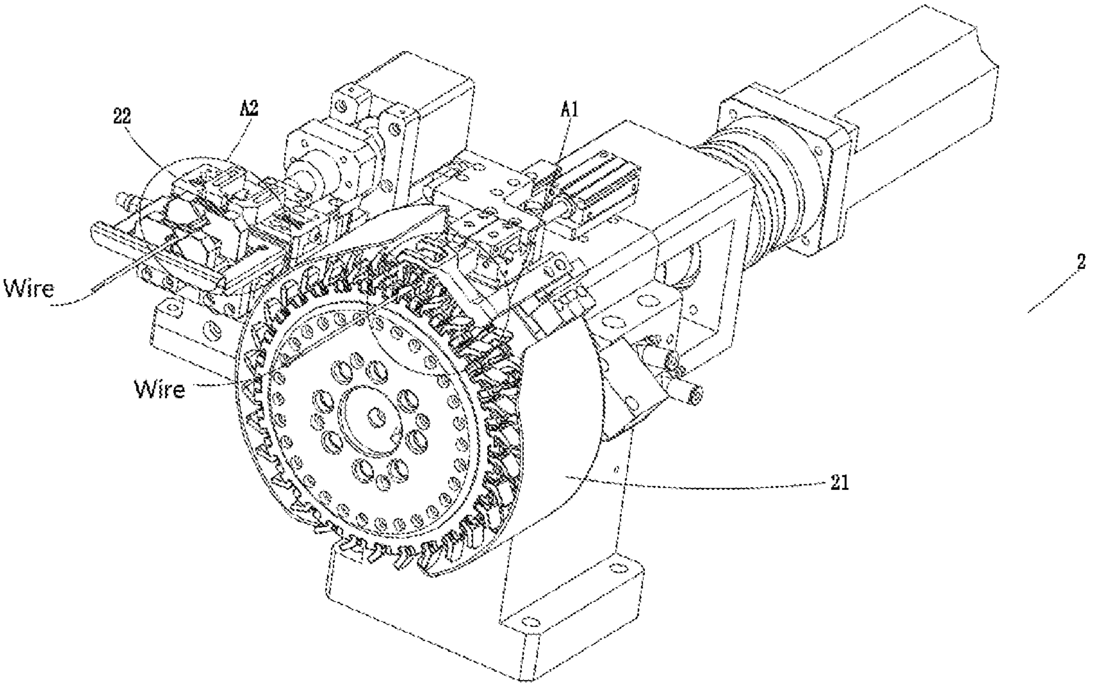
FIG. 3 is a schematic diagram of a wire storage portion of the connector insert device for automatic switching of connector fixtures of the present disclosure.

Furthermore, as shown in FIG. 3, the wire storage portion 2 comprises wire storage component 21 and a wire feeding component 22 fixedly connected with the wire storage component 21. The wire storage component 21 are arranged between the terminal fixing portions 1 and the wire feeding component 22.

In one embodiment, the wire storage portion 2 is a disk structure, and the wire storage component 21 are arranged on a circumference of the wire storage portion 2.

Optionally, the wire storage component 21 are arranged on the circumference of the wire storage portion 2 at equal intervals.

Figure 4:
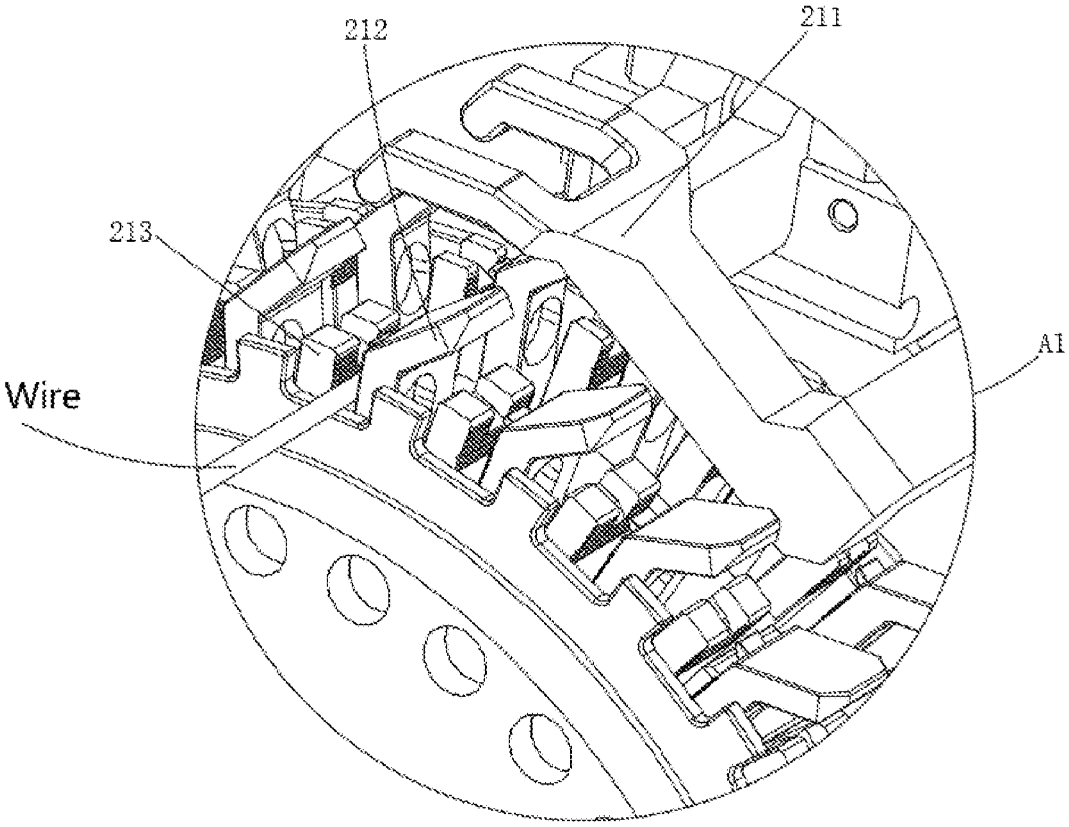
FIG. 4 is an enlarged schematic diagram of portion A1 of the wire storage portion of the connector insert device for automatic switching of connector fixtures of the present disclosure shown in FIG. 3.

As shown in FIG. 4, each of the wire storage component 21 comprises a wire storage wrench 211, wire storage buckles 212, and wire storage grippers 213.

Specifically, the wire storage buckles 212 and the wire storage grippers 213 comprise wire storage clipping surfaces. The wire storage clipping surfaces are made of flexible materials, such as rubber. When installation, the wire storage clipping surfaces of the wire storage buckles 212 are opposite to the wire storage clipping surfaces of the wire storage grippers 213. When a distance between each wire storage gripper 213 and an adjacent wire storage buckle 212 reaches a predetermined wire storage clipping distance, the wires in the wire storage grippers 213 are locked and are unable to move. Thus, the wire storage buckles 212 and the wire storage grippers 213 not only clip the terminals of the wires, but also avoid damage to the wire or surfaces of the terminals. Because the wire storage clipping surfaces of the wire storage buckles 212 and the wire storage clipping surfaces of the wire storage grippers 213 are made of a flexible material, the adaptable range of the wire storage component 21 is expanded. For wires with small diameter differences, there is no need to adjust the predetermined wire storage clipping distance, it can be used compatible.

In one embodiment, the wire storage component 21 are disc-shaped and are rotatable along a center of the wire storage component 21. A plurality of wire storage buckles 212 and a plurality of wire storage grippers 213 one-to-one corresponding to the plurality of wire storage buckles 212 are provided. Positions of the wire storage buckles 212 and positions of the wire storage grippers 213 change with rotation of the wire storage component 21. In this way, the wire storage component 21 can store a plurality of wires and therefore reduces an installation space required by the wires.

In one embodiment, in order to ensure high reliability of clipping of the wires, two wire storage component 21 are overlapped to respectively clip two ends of each of the wires. The centers of the two wire storage component 21 overlap each other. One wire storage component 21 close to the conveying portion 6 is configured to clip the wires, and the other wire storage component 21 away from the conveying portion 6 is configured to clip the terminals of a predetermined angle.

Specifically, each wire storage wrench 211 is hinged with the wire storage portion 2. The wire storage component 21 rotate to drive the wire storage buckles 212 and the wire storage grippers 213 to a predetermined wire storage position. Then each wire storage wrench 211 moves closer to the wire storage buckles 212. After each wire storage wrench 211 is snapped on a corresponding wire storage buckle 212, each wire storage wrench 211 unlocks the corresponding wire storage buckle 212, so that a distance between the wire storage buckles 212 and an adjacent wire storage gripper 213 increases, The insert portion 5 first clips the terminal head, and then clips the terminal tail to take away the wire.

In one embodiment, when the wire storage component 21 clips the wires, the terminal heads are away from the conveying portion 6.

Figure 5:
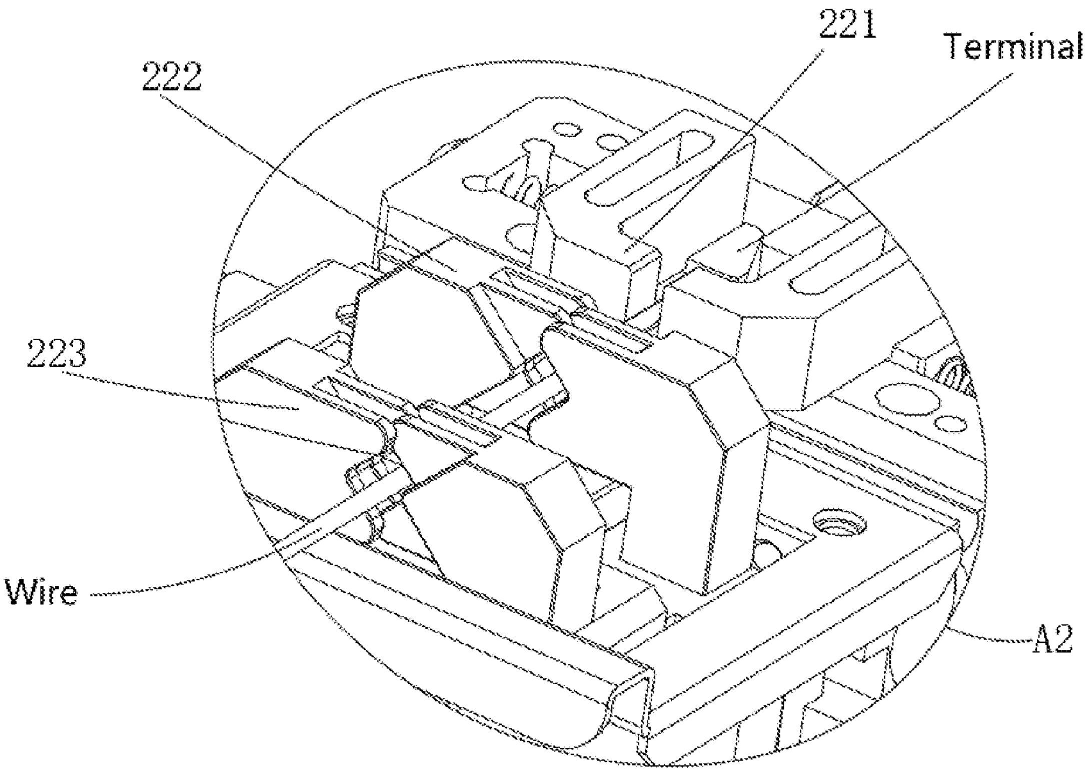
FIG. 5 is an enlarged schematic diagram of portion A2 of the wire storage portion of the connector insert device for automatic switching of connector fixtures of the present disclosure shown in FIG. 3.

As shown in FIG. 5, in one embodiment, the wire feeding component 22 comprises a first wire feeding system 221, a second wire feeding system 222, and a third wire feeding system 223. The third wire feeding system 223 is arranged between the second wire feeding system 222 and the conveying portion 6. The second wire feeding system 222 is arranged between the first wire feeding system 221 and the third wire feeding system 223.

Specifically, the first wire feeding system 221 comprises a terminal groove configured to receive the terminal head.

The first wire feeding system 221 comprises a wire clipping groove configured to clip the terminal tail. The second wire feeding system 222 and the third wire feeding system. 223 are configured to clip the wire. When the wire is released, the insert portion 5 first clips the terminal head, then the first wire feeding system 221 releases the terminal. Then the insert portion 5 clips the terminal tail, the second wire feeding system 222 and the third wire feeding system 223 simultaneously release the wire, and the insert portion 5 takes the wire away. In this way, it can be ensured that the predetermined angle of the wire does not change when the wire is moved from the wire feeding component 22 to the insert portion 5.

In one embodiment, when the wire feeding component 22 clips the wires, the terminal heads are away from the conveying portion 6.

In one embodiment, the wires are transferred from the terminal fixing portions 1 to the wire storage portion 2 by the transferring portion 3.

Figure 6:
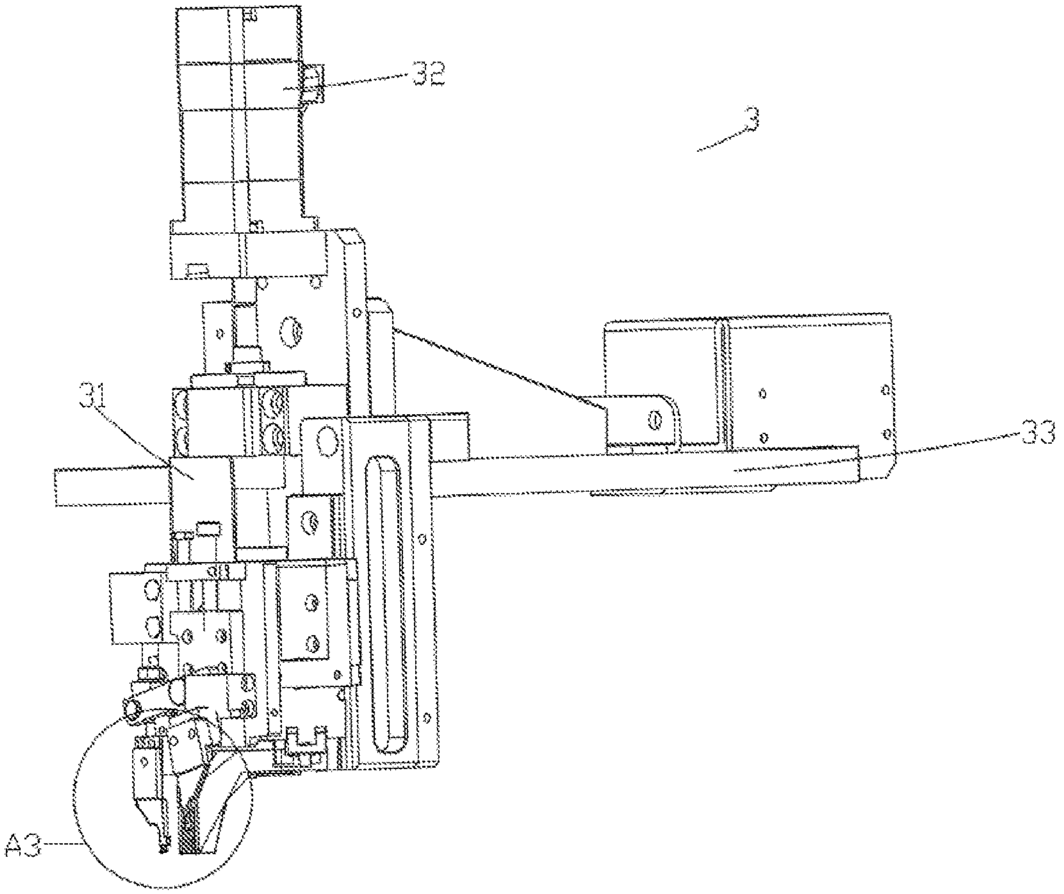
FIG. 6 is a schematic diagram of a transferring portion of the connector insert device for automatic switching of connector fixtures of the present disclosure.

Further, as shown in FIG. 6, the at least one transferring portion 3 comprises a transferring base 31, a transferring motor 32, and a transferring bracket 33, The transferring base 31 is fixedly connected with the transferring bracket 33. The transferring bracket 33 is connected with the conveying portion 6 and is movable along the conveying portion 6.

Furthermore, the at least one transferring portion 3 comprises a first transferring clipping component and a second transferring clipping component. The first transferring clipping component is arranged between the transferring clipping component and the wire storage portion and is close to the second transferring clipping component. The first transferring clipping component is configured to clip a terminal head. The second transferring clipping component is configured to clip a terminal tail.

Optionally, in order to improve the processing efficiency of the present disclosure, two transferring portions 3 are arranged side by side, so that when two terminals are connected to a same wire, the two transferring portions 3 can clips the two terminals at the same time. Even if the predetermined angles of the two terminals are different, the two transferring portions 3 are able to adapt to them.

In one embodiment, according to the predetermined instruction, the transferring portions 3 transfer the wire to be immediately transferred to the insert portion 5 to the wire feeding component 22, and transfer the wire that does not need to be immediately transferred to the insert portion 5 to the wire storage component 21.

In one embodiment, in order to improve a distance adjustment accuracy of the transferring portions 3, each transferring motor 32 is a servo motor.

In one embodiment, when the transferring portions 3 clip the wire, the terminal head is away from the transferring base 31.

Figure 7:
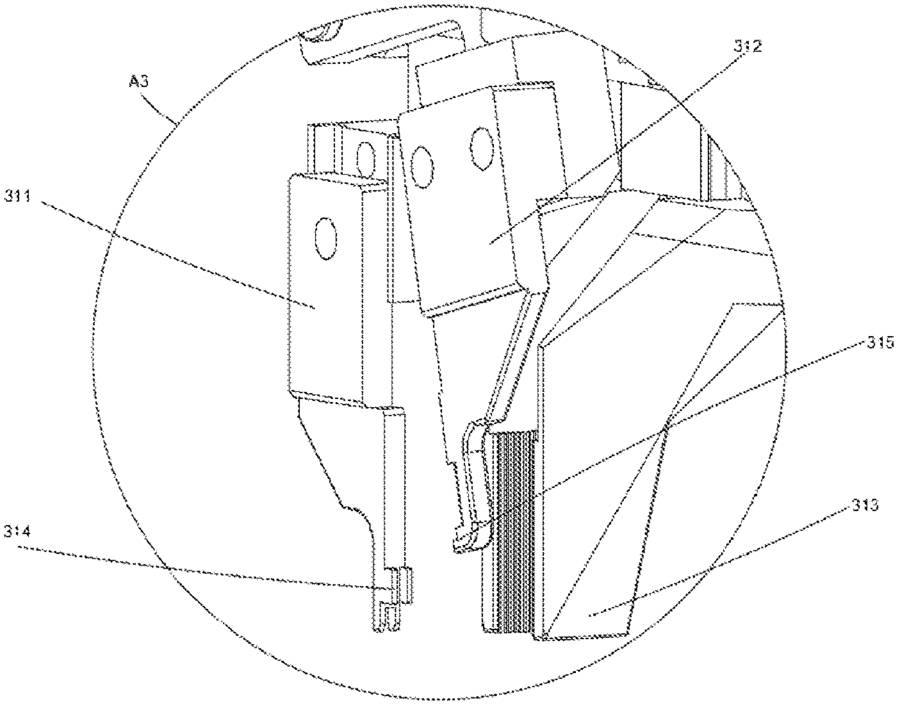
FIG. 7 is an enlarged schematic diagram of portion A3 of the transferring portion of the connector insert device for automatic switching of connector fixtures of the present disclosure shown in FIG. 6.
Figure 8:
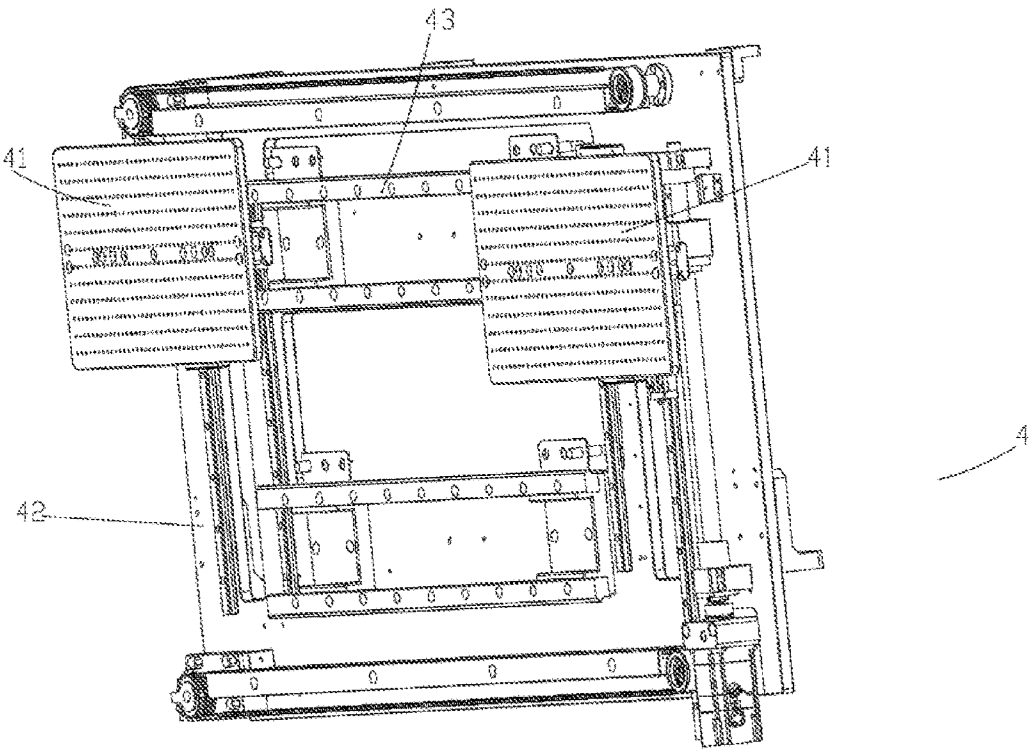
FIG. 8 is a schematic diagram of a connector fixing portion of the connector insert device for automatic switching of connector fixtures of the present disclosure.

As shown in FIG. 7, in one embodiment, each first transferring clipping component comprises a first transferring gripper 311 and a second transferring gripper 312. Each first transferring gripper 311 comprises a first transferring clipping boss 314. Each second transferring gripper 312 comprises a second transferring clipping boss 315.

In one embodiment, each first transferring gripper 311 is fixedly connected with a corresponding transferring base 31. Each second transferring gripper 312 is connected with a corresponding transferring base 31 through a connecting shaft and is rotatable relative to a corresponding first transferring gripper 311 through the connecting shaft.

Specifically, when each first transferring clipping boss 314 moves away from a corresponding transferring bracket 33 in a direction perpendicular to the corresponding transferring bracket 33 and contacts the corresponding terminal, each second transferring gripper 312 rotates clockwise from a first transferring starting position to a first predetermined transferring position. At this time, one end of each second transferring clipping boss 315 facing the transferring base 31 cooperates with each first transferring clipping boss 314 to clip one terminal head. Thus, the predetermined angle of the wire is kept unchanged.

Optionally, each second transferring clipping component comprises two third transferring grippers 313. The third transferring grippers 313 have clipping surfaces. When installing, the clipping surfaces of each two third transferring grippers 313 are opposite to each other. and are movable with respect to each other When the two third transferring grippers 313 of each second transferring clipping component move toward each other and when a distance between the two third transferring grippers 313 is reduced to a predetermined third transferring distance, each second transferring clipping component clips one terminal tail. When the two third transferring grippers 313 of each second transferring clipping component move away from each other, the distance between the two third transferring grippers 313 of each second transferring clipping component increases, and each second transferring clipping component releases the one terminal tail.

In one embodiment, each first transferring clipping component is configured to clip one terminal head, and each second transferring clipping component is configured to clip one terminal tail.

Specifically, when the transferring portions 3 clips the wire from the terminal fixing portions 1, the first transferring clipping components first clip the terminal heads. Then the terminal fixing portions 1 release the wire, the second transferring clipping components clip the terminal tails, and the transferring portions 3 take away the wire.

Furthermore, when the transferring portions 3 transfer the wire to the wire storage portion 2, the first transferring clipping components first place the clipped terminal heads in the wire storage portion 2 at the predetermined angle, and the wire storage portion 2 clips the terminals. Then the second transferring clipping components release the terminal tails, the wire storage portion 2 immediately clips the wire, and then the first transferring clipping components and the second transferring clipping components synchronously move away from the wire storage portion 2, so that when the transferring portions 3 transfer the wire to the wire storage portion 2, the predetermined angle of the terminals does not change.

Furthermore, the connector fixing portion 4 comprises connector fixing bases 41 and a connector bracket 42. The connector fixing bases 41 are movable to a predetermined fixing position along the connector bracket 42.

Specifically, a front side of each of the connector fixing bases 41 is provided with connecting grooves configured to install connectors. Rollers matched with the connector bracket 42 are arranged on a back side of each of the connector fixing bases 41.

In one embodiment, the connector bracket 42 is a square frame structure.

In one embodiment, the connector bracket 42 comprises pulleys and rails, and the connector fixing bases 41 are movable on the rails.

In one embodiment, the connector fixing bases 41 are removable from the connector bracket 42 for replacement.

In one embodiment, the connectors are configured for the wires to insert into, and are manually arranged on the connector fixing seat 41 according to a predetermined connector fixing position. In order to improve an efficiency of the connector insertion, multiple connectors are arranged on each of the connector fixing bases 41 at same time. After the connectors are arranged, the connector fixing bases 41 are moved to predetermined fixing positions along the connector bracket 42 according to an insertion instruction.

In one embodiment, connector support columns 43 are arranged according to the predetermined fixing positions, so as to improve stability of the connector fixing bases 41.

In one embodiment, the connector support columns 43 is arranged in the connector bracket 42 and are detachably connected with the connector bracket 42. When the connector fixing bases 41 are in the predetermined fixing positions, the connector support columns 43 are configured to enhance the stability of the connector fixing bases 41. By arrangement of the connector support columns 43, the predetermined fixing position are flexibly set by changing positions of the connector supporting columns 43.

In one embodiment, two connector fixing bases 41 are provided, so that the current processing is not affected when one of the connector fixing bases 41 is replaced, and the work efficiency is improved.

Figure 9:
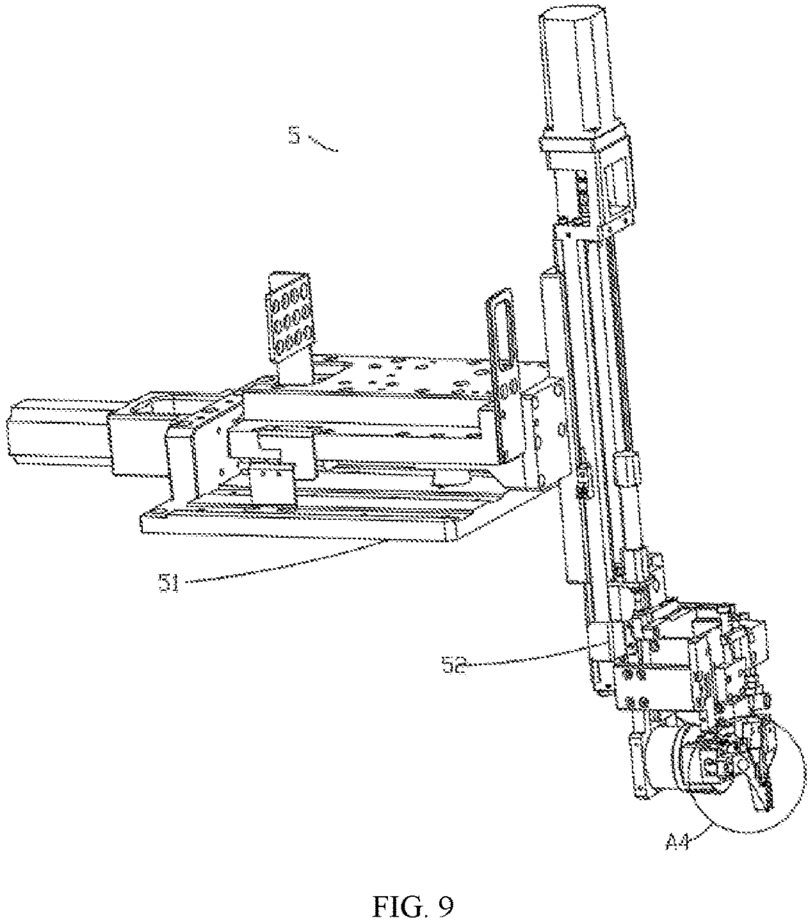
FIG. 9 is a schematic diagram of an insert portion of the connector insert device for automatic switching of connector fixtures of the present disclosure.

Furthermore, as shown in FIG. 9, the insert portion 5 comprises an insert base 51. The insert base 51 is movable along the conveying portion 6.

In one embodiment, the insert portion 5 further comprises a first insert component and a second insert component. The second insert component is arranged between the first insert component and the insert base 51. The second insert component is close to the first insert component.

In one embodiment, the insert portion 5 further includes an insert fixture base 52. The first insert component and the second insert component are installed on the insert fixture base 52.

In one embodiment, when the insert portion 5 clips the wire, the terminal heads are away from the insert base 51.

In one embodiment, the insert fixture base 52 is movable toward and away from the connector fixing bases 41 relative to the insert base 51.

Figure 10:
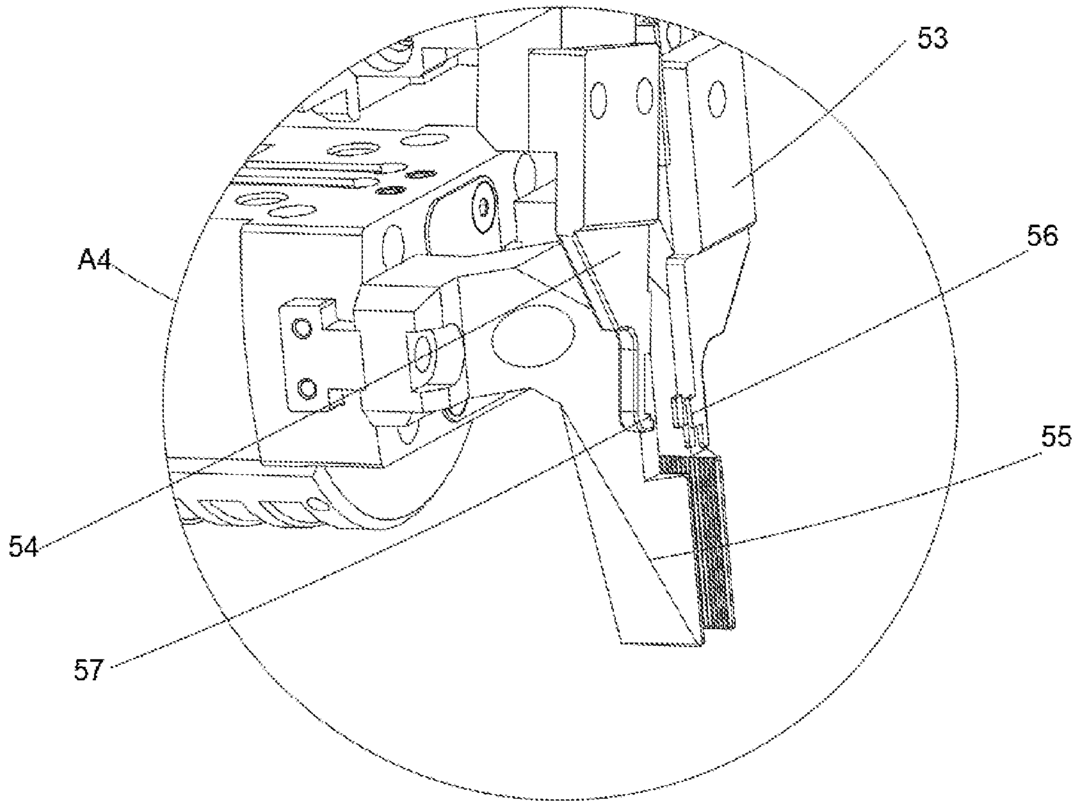
FIG. 10 is an enlarged schematic diagram of portion A4 of the insert portion of the connector insert device for automatic switching of connector fixtures of the present disclosure shown in FIG. 9.

Furthermore, as shown in FIG. 10, the first insert component comprises a first insert gripper 53 and a second insert gripper 54. A first insert boss 56 is arranged on the first insert gripper 53. A second insert boss 57 is arranged on the second insert gripper 54. The first insert boss 56 and the second insert boss 57 are configured to fix a direction of the terminal to ensure that the predetermined angle of the terminal does not change.

Specifically, after one side of the first insert boss 56 moves away from the insert base 51 in a direction perpendicular to the insert base 51 and contacts the terminal, the second insert boss 57 rotates counterclockwise from the first insert starting position to a first predetermined insert position. At this time, one end of the second insert boss 57 facing the insert base 51 cooperates with the first insert boss 56 to clip the terminal. In this way, the predetermined angle of the wire is kept unchanged.

Optionally, the second insert component comprises two third insert grippers 55. The two third insert grippers 55 have clipping surfaces. When installing, the clipping surfaces of the two third insert grippers 55 are opposite to each other. and are movable with respect to each other When the two third insert grippers 55 move toward each other and when a distance between the two third insert grippers 55 is reduced to a first predetermined insert distance, the second insert component clips the wire. When the two third insert grippers 55 move away from each other, the distance between the two third insert grippers 55 increases, and the second insert component releases the wire.

Specifically, when the insert portion 5 clips the wire from the wire storage portion 2, the wire storage portion 2 first releases the terminal, the first insert component grippers the terminal. Then the wire storage portions 2 releases the wire, and the second insert component clips the wire. Thus, when the insert portion 5 clips the wire from the wire storage portion 2, the predetermined angle of the wire does not change.

In one embodiment, the first insert component clips the terminal head, and the second insert component clips the terminal tail.

In one embodiment, when the insert portion 5 insert the wire into the connector fixing portion 4, the insert portion 5 moves to a predetermined insert position along the conveying portion 6. At this time, the predetermined insert position is corresponding to the predetermined fixing positions. That is, a position of the wire on the insert portion 5 corresponds to a position of a connector to be inserted on the connector fixing portion 4. When the wire is inserted in, the first insert component releases the terminal heads, and the insert fixture base 52 drives the first insert component and the second insert component to move synchronously to the connector fixing portion 4. When the insert fixture base 52 reaches a second predetermined insert position, the terminals are fixed on the connector to be inserted on the connector fixing portion 4. The second insert component releases the terminal tails, and the insert fixture base 52 drives the first insert component and the second insert component to move away from the connector fixing portion 4 to complete work of inserting the wire into the connector.

Working principle and use flow of the present disclosure is as follow:

The terminal fixing portions 1 clip and rotate the wire to be inserted to the predetermined angle to fix an angle of the wire and the terminals. The transferring portions 3 transfer the wire rotating to the predetermined angle to the wire storage portion 2. The insert portion 5 takes out the wire to be inserted from the wire storage portion 2 according to the predetermined angle of the wire, and then inserts the wires to be inserted into the connector fixing portion 4 according to the predetermined angle of the wire, The transferring portions 3 and the insert portion 5 are movable on the conveying portion 6 to complete transferring and inserting of the wire.

The connector insert device for automatic switching of the connector fixtures of the present disclosure only needs to set a processing sequence of the wire and an inserting angle of the terminal at beginning to automatically complete the work of inserting the wire into the connector. The connector insert device for automatic switching of the connector fixtures of the present disclosure adapts to different sizes of wires and different inserting angles of terminals, which has characteristics of wide adaptability, high degree of automation, and high production efficiency.

Although the embodiments of the present disclosure have been shown and described, those of ordinary skill in the art can understand that various changes, modifications, substitutions, and variations can be made to these embodiments without departing from the principle and spirit of the present disclosure. The scope of the present disclosure is defined by the appended claims and their equivalents.

In the above-mentioned embodiments, descriptions of each embodiment have their own emphasis. For parts that are not described in detail or recorded in one embodiment, reference may be made to related descriptions of other embodiments.

Those of ordinary skill in the art can realize that units and algorithm steps of each example described in conjunction with the embodiments disclosed herein can be implemented in electronic hardware, or a combination of computer software and electronic hardware. Whether these functions are performed in hardware or software depends on the specific application and design constraints of the technical solutions. Those of ordinary skill in the art may implement the described functionality using different methods for each particular application, and such implementations should not be considered beyond the scope of the present disclosure.

The above-mentioned embodiments are only used to illustrate technical solutions of the present disclosure, but not to limit the present disclosure. Although the present disclosure has been described in detail with reference to the foregoing embodiments. It should be understood that those of ordinary skill in the art are still able to modify the technical solutions described in the foregoing embodiments, or equivalently replace some of the technical features in the foregoing embodiments; and these modifications or replacements do not make the essence of the corresponding technical solutions deviate from spirit and scope of the technical solutions of the embodiment of the present disclosure, which shall be included in the protection scope of the present disclosure.

What is claimed is:

1. A connector insert device for automatic switching of connector fixtures, comprising:

at least one terminal fixing portion configured to hold a wire to be inserted;

a wire storage portion configured to store groups of wires to be inserted;

at least one transferring portion configured to store the wire to be inserted by the at least one terminal fixing portion in the wire storage portion through a conveying portion;

a connector fixing portion configured to store connectors of the groups of wires to be inserted; and an insert portion configured to insert the groups of wires to be inserted in the wire storage portion to the connector fixing portion through the conveying portion;

wherein the at least one terminal fixing portion comprises a terminal fixing base, a terminal clipping base, and a terminal gripper; the terminal clipping base is rotatably connected with the terminal fixing base through a terminal connecting shaft; the terminal gripper is fixedly connected with the terminal clipping base; the at least one terminal fixing portion rotates the wire to be inserted to a predetermined angle; the at least one transferring portion clips the wire rotated by the predetermined angle and places the wire rotated by the predetermined angle in the wire storage portion according to a predetermined instruction;

wherein the wire storage portion comprises wire storage components; each of the wire storage components comprises a wire storage wrench, wire storage buckles, and wire storage grippers: the wire storage buckles are one-to-one corresponding to the wire storage grippers; the wire storage buckles and the wire storage grippers are configured to clip wires to be clipped; when each wire storage wrench is snapped on one of the wire storage buckles, a corresponding wire is released;

wherein the wire storage components are disc-shaped and are rotatable along centers of the wire storage components; two wire storage components are provided and are overlapped to respectively clip two ends of each of the wires; the centers of the two wire storage components overlap each other; a first one of the wire storage components close to the conveying portion is configured to clip the wires, and a second one of the wire storage components away from the conveying portion is configured to clip the terminals of a predetermined angle;

wherein the wire storage portion comprises a wire feeding component; the wire feeding component comprises a first wire feeding system, a second wire feeding system, and a third wire feeding system; the third wire feeding system is arranged between the second wire feeding system and the conveying portion; the second wire feeding system is arranged between the first wire feeding system and the third wire feeding system; the first wire feeding system comprises a terminal groove configured to receive a corresponding terminal head; the first wire feeding system comprises a wire clipping groove configured to clip a corresponding terminal tail; the second wire feeding system and the third wire feeding system are configured to clip a corresponding wire; when the corresponding wire is released, the insert portion first clips the corresponding terminal head, then the first wire feeding system releases the terminal; the insert portion clips the corresponding terminal tail; the second wire feeding system and the third wire feeding system simultaneously release the corresponding wire, and the insert portion takes the corresponding wire away;

wherein the at least one transferring portion comprises a transferring base, a transferring motor, and a transferring bracket; the transferring base is fixedly connected with the transferring bracket; the transferring bracket is connected with the conveying portion and is movable along the conveying portion; the at least one transferring portion comprises a first transferring clipping component and a second transferring clipping component; the first transferring clipping component is arranged between the transferring clipping component and the wire storage portion; the first transferring clipping component is close to the second transferring clipping component;

wherein the first transferring clipping component comprises a first transferring gripper and a second transferring gripper; the first transferring gripper comprises a first transferring clipping boss; the second transferring gripper comprises a second transferring clipping boss;

wherein the second transferring clipping component comprises two third transferring grippers; the third transferring grippers have clipping surfaces; the first transferring clipping component is configured to clip a corresponding terminal head; the second transferring clipping component is configured to clip a corresponding terminal tail;

wherein the first transferring gripper is fixedly connected with the transferring base; the second transferring gripper is connected with the transferring base through a connecting shaft and is rotatable relative to the first transferring gripper through the connecting shaft; when the first transferring clipping boss moves away from the transferring bracket in a direction perpendicular to the transferring bracket and contacts the corresponding terminal, the second transferring gripper rotates clockwise from a first transferring starting position to a first predetermined transferring position; one end of the second transferring clipping boss facing the transferring base cooperates with the first transferring clipping boss to clip a corresponding terminal head.

2. The connector insert device for automatic switching of connector fixtures according to claim 1, wherein the terminal gripper comprises a first terminal gripper and a second terminal gripper; the first terminal gripper has a first terminal groove; the second terminal gripper has a second terminal groove corresponding to the first terminal groove; the second terminal groove is embeddable in the first terminal groove.

3. The connector insert device for automatic switching of connector fixtures according to claim 1, wherein two transferring portions are provided.

4. The connector insert device for automatic switching of connector fixtures according to claim 1, wherein the connector fixing portion comprises connector fixing bases and a connector bracket; the connector fixing bases are movable to a predetermined fixing position along the connector bracket.

5. The connector insert device for automatic switching of connector fixtures according to claim 1, wherein the insert portion comprises an insert base; the insert base is movable along the conveying portion.

6. The connector insert device for automatic switching of connector fixtures according to claim 5, wherein the insert portion further comprises a first insert component and a second insert component; the second insert component is arranged between the first insert component and the insert base; the second insert component is close to the first insert component; the first insert component is configured to clip a corresponding terminal head and the second insert component is configured to clip a corresponding terminal tail.

7. The connector insert device for automatic switching of connector fixtures according to claim 1, wherein the conveying portion is a linear motor.

* * * * *